United States Patent [19]

Capel et al.

[11] Patent Number: 5,063,338

[45] Date of Patent: Nov. 5, 1991

[54] POWER MODULE FOR ELECTRONIC CONTROL OF A DC MOTOR

[75] Inventors: Antoine Capel, Ramonville; Jean-Claude Marpinard, Toulouse, both of France

[73] Assignee: Alcatel Espace, Courbevoie, France

[21] Appl. No.: 501,223

[22] Filed: Mar. 29, 1990

[30] Foreign Application Priority Data

Mar. 30, 1989 [FR] France .............................. 89 04167

[51] Int. Cl.$^5$ ............................................ G05B 19/40
[52] U.S. Cl. ................................... 318/685; 318/696; 318/138; 318/254; 318/599; 323/266; 323/268; 323/272; 363/55; 363/56; 363/57; 363/58; 363/98; 363/41; 363/136
[58] Field of Search ............... 318/696, 685, 138, 254, 318/294, 599, 561; 323/266, 268, 272; 363/55-58, 98, 41, 136

[56] References Cited

U.S. PATENT DOCUMENTS

| | | | |
|---|---|---|---|
| 3,742,330 | 6/1973 | Hodges et al. | 323/266 |
| 4,420,717 | 12/1983 | Wallace et al. | 318/685 |
| 4,507,724 | 3/1985 | Glennon | 363/41 |
| 4,574,228 | 3/1986 | Blue et al. | 318/696 |
| 4,581,565 | 4/1986 | Van Pelt et al. | 318/294 |
| 4,634,948 | 1/1987 | Brigham | 318/685 |
| 4,677,356 | 6/1987 | Tsuneda et al. | |
| 4,686,615 | 8/1987 | Ferguson | 323/266 X |
| 4,820,986 | 4/1989 | Mannfield et al. | 363/98 X |

FOREIGN PATENT DOCUMENTS 0078394  5/1983  European Pat. Off. .

OTHER PUBLICATIONS

Kenjo, "Stepping Motors", Clarendon Press, Oxford 1984, pp. 49; 141-143.
Singland, "Small Steps", Power Conversion International, Oct. 1983, pp. 20-25.
Patent Abstracts of Japan, vol. 11, No. 265, (E-535) (2712); Aug. 27, 1987; & JP-A 62 68096 (Fujitsu), Mar. 27, 1987.

Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

A power supply module for control electronics of a DC motor, the module comprising a power cell of the step-down type controlled as a function of peak current, the current flowing in both directions, and the module including a bridge stage likewise capable of passing current in both directions and including a reactive element constituted by one of the windings of the DC motor. The invention is particularly suitable for space applications.

3 Claims, 1 Drawing Sheet

POWER MODULE FOR ELECTRONIC CONTROL OF A DC MOTOR

The invention relates to a power module for electronic control of a DC motor.

BACKGROUND OF THE INVENTION

In space applications, ever increasing use is being made of moving equipment: aiming equipment, equipment for deploying antennas, equipment for aiming cameras, robotic equipment, etc. The invention satisfies the need for developing a complete control system which is usable for these various applications.

SUMMARY OF THE INVENTION

The invention provides a power module for electronic control of a DC motor, the module comprising in succession:

a two-directional current power stages delivering voltage pulses of variable duration and of controlled current amplitude from a non-regulated voltage source; and a bridge stage which is likewise two-directional, having two-directional switches and in which the reactive element is one of the motor windings; and wherein the current which flows through said winding is a triangular waveform current; and wherein positioning control of the motor over a full step or over a microstep is performed by regulating said current flowing through the winding to comply with a reference value of the sinewave type.

Advantageously, the current in said module has two-directional characteristics. In addition, its operating principle associates simultaneously the peak current and the mean current in the winding.

Advantageously, peak current control protects the device against possible destructive surges, provides operation over a large dynamic range, and provides a good stability margin.

Advantageously, the two-directional current characteristic makes it possible to ensure constant impedance under load, and four-quadrant type operation (quadrature between voltages and current) which is indispensable to make energetic breaking and acceleration possible, associating dynamic range and energy efficiency.

BRIEF DESCRIPTION OF THE DRAWING

An embodiment of the invention is described by way of example with reference to the accompanying drawing, in which.

DETAILED DESCRIPTION

DC motors or stepper motors, have dynamic characteristics such that they run the risk of becoming sloppy in operation if the control is poorly adapted to the load. The performance of automatic machinery using such motors thus depends on the characteristics of the motors, on their loads, and also on the quality of the controlling electronics. The amplification of the control signals is thus adapted to the principles on which the controlling electronics are based.

These principles may be:

a judicious distribution of pulses over time, with the pulses being generated by a hard-wired logic system or by a microprocessor; or generating sinewave type analog signals for inducing sinewave type currents in the motor winding, with the signals corresponding to optimum control as devised by a hard-wired logic circuit or by a microprocessor.

The controlling electronics may be designed to operate in an open loop (for a known and constant load) or in a closed loop.

The control may be direct: the power switch is then directly controlled by a logic signal. The power member may be constituted by one, two, or four transistors. Four-quadrant control (using a transistor bridge) is required for DC motors that have a braking and stop mode.

Several solutions exist for regulating the current by on/off switching:

A pulse width modulation (PWM) cell may be used: an image of the mean value of the current is applied to an error amplifier which modulates the duration of conducting times. This solution requires a fixed frequency and provides good accuracy.

Fixed off durations: when the current exceeds the referenced value, the bottom transistors are switched off for a fixed period of time. This gives rise to a variable switching frequency.

Fixed switching period: the bottom transistors are switched off when the mean current exceeds the reference value but they are then reactivated at a fixed frequency.

The control may be indirect: it then consists in interfacing the control electronics and the motor winding via a digital-to-analog converter, with a voltage or current regulator feeding a transistor bridge.

From a DC voltage supply VB, it is possible to vary a stepdown PWM cell constituted by a switch, e.g. made of a transistor and a diode, feeding a transistor bridge and the motor winding. The switching transistor applies a voltage V to the winding as a function of the conducting duty ratio $\gamma$, such that $V = \gamma VB$.

The duty ratio $\gamma$ may be controlled directly by a sinewave reference or else by a regulating system, with the regulated parameter being input current i. This information i may be used for protecting the system against surge currents by opening the switching transistor.

These systems are one-directional in the sense that the current i always goes from the source towards the motor.

The control provided by the invention is of the same type, but it is two-directional.

Figure 1:
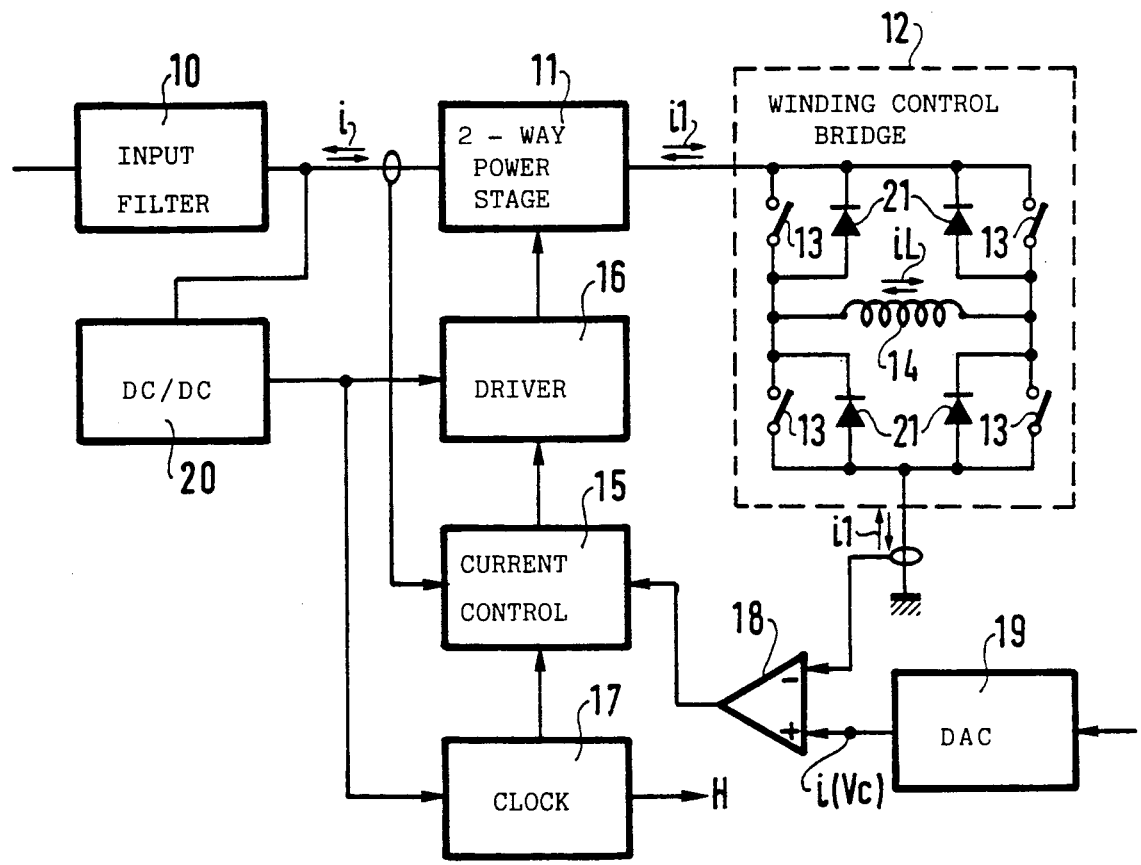
FIG. 1 shows a module of the invention.

Thus, the module of the invention shown in FIG. 1 comprises the following in succession:

an input filter 10;

a two-directional current power stage 11 delivering a voltage pulse of variable duration derived from a non-regulated voltage source and accompanied by a current whose amplitude is controlled;

a bridge stage 12 having two-directional switches 13 represented diagrammatically in the figure by switch contacts, the switches being excited on the diagonal and being connected to the winding 14 of the motor to be controlled (a DC motor, a stepper motor). Each two-way switch 13 is associated with a diode 21.

The module also includes:

a current control cell 15 connected to the power stage via a driver stage 16 and receiving a signal from the clock module 17, a signal coming from the input filter 10, and a signal coming from an error amplifier 18 which receives a current reference value i(Vc) as delivered by a digital-to-analog converter 19, together with a current value from the bridge 12.

A DC-DC converter 20 connected to the output of the input filter and controlling the clock module 17 and the driver stage 16.

The module of the invention serves to generate current iL through the winding 14 of a DC motor, and depending on the direction and waveform of the current iL, the motor which is a pulse-operated motor is positioned.

The motor-controlling power amplifier of the invention associates a stepdown type peak current controlled power cell (operating with both the directions of current flow), with a bridge stage which is likewise bothway and whose reactive element (14) is one of the motor windings. The current iL flowing in the motor winding is the parameter that is to be regulated by being compared with a reference value. The current iL may flow in either direction in this case.

The power stage 11 serves to provide a triangular current waveform varying between a minimum value im and a maximum value iM which may reach values that are destructive for the components used. Operating discontinuities are due to the diodes 21. The power stage 11 is used to generate a pulse of variable duration $\tau$ which is applied to the bridge stage 12. A sawtooth current waveform is thus obtained in the winding 14, which waveform, within each period, comprises two linear portions of opposite slope: the first portion has the form $(V-Vo)t/L$ during charging, and the second portion has the form $-(Vo)t/L$ during discharging (because of the diodes 21).

The amplitude of this current may be controlled by acting on the duration $\tau$.

The values of current used are limited to non-destructive values by regulating the value of the peak current. This provides current protection even if there is a short circuit. An image of the mean value of the current is applied to the error amplifier 18 and is compared therein with the reference value i(Vc). This makes it possible to modulate the conduction time. The positioning of the motor is then controlled over a full step or a microstep by regulating the current in the winding to correspond to a reference value i(Vc) which is of the sinewave type.

Advantageously, the module of the invention simultaneously controls peak current and mean current in the winding 14. In addition, the current iL can flow in both directions:

By controlling peak current, the device is protected against possible destructive current surges, and operation is provided over a large dynamic range with a good stability margin (the system is equivalent to a first order system excited by a current source).

The two-directional characteristic of the current makes it possible to ensure constant impedance under load, and four-quadrant type operation (quadrature between voltages and current) which is essential for enabling energetic braking and acceleration, associating a large dynamic range and energy efficiency. In addition, the two possible directions of flow of the current i make it possible for the input filter to recover excess energy.

The motor may be required to take up a position quickly. A variable functioning law (acceleration, deceleration) makes it possible to obtain current-voltage quadrature. The motor is deactivated on control or in the event of danger (abutment).

Figure 2:
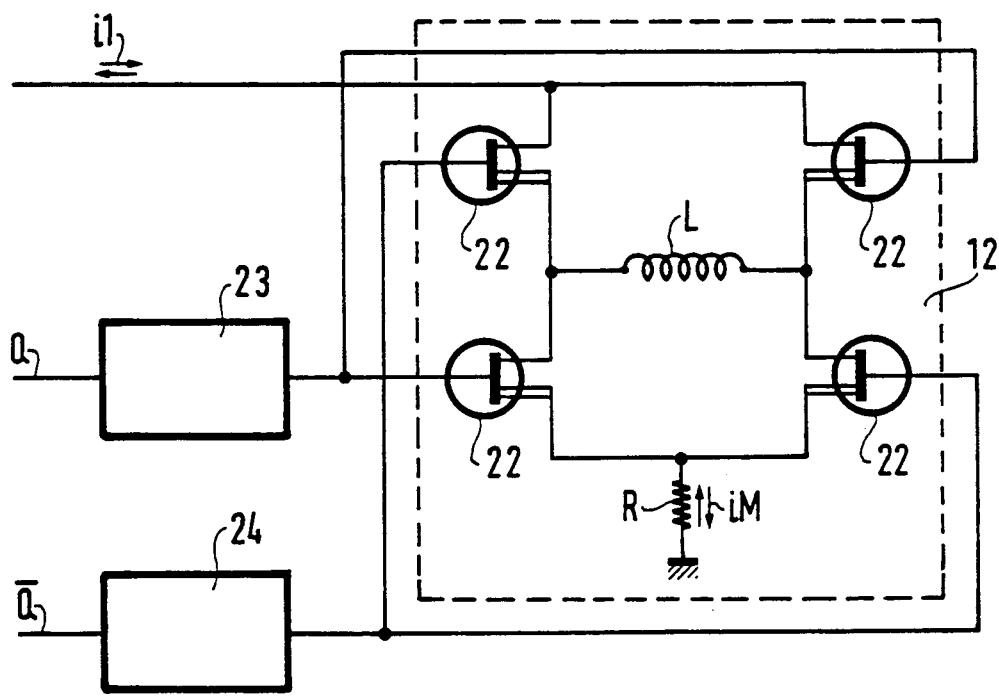
FIG. 2 shows an embodiment of the circuit of a module of the invention.

In an embodiment shown in FIG. 2, the switches 13 and the diodes 21 of the bridge 12 are replaced by HEX-FET type transistors (i.e. field effect transistors that conduct in both directions). These transistors 22 are connected in pairs to two floating control stages 23 and 24 corresponding to each of the current flow directions and respectively receiving opposite control signals Q and $\overline{Q}$.

For use in space applications, such analog control in accordance with the invention may, for example, have the purpose of applying the logical control law that corresponds to optimum operation of a moving antenna to the by DC motors that control the positioning of the antenna. Such an electronic assembly therefore comprises a digital-to-analog interface and a power function which controls the electromagnetic force of each motor by taking the energy required for the moving platform of the satellite.

Thus, a digital signal from the logic module is applied to the digital-to-analog converter 19 which serves to generate a sinewave type signal. This sinewave function is transformed into a rectified sinewave function associated with a binary signal defining its sign. This altered representation of the original information made because these two signals are applied to different elements of the power function in order to regulate the current flowing through the winding 14 of the motor to a value which is proportional to the amplitude of the sinewave function.

The regulation of on the rectified sinewave is performed by a regulation function realized by the power stage 11 using a current control cell 15, with the inductance in the power structure being provided by the motor winding 14. The positive and negative current flow iL in the winding 14 is obtained by activating one or the other of the two branches of a transistor bridge 12.

The analog control modules are connected to the satellite electricity distribution system via the input filter 10. The current absorbed during transients or in the event of an electronic failure or of a motor failure is limited by the operation of the current control cell. The direction of current flow through the motor winding 14 is controlled by the transistor bridge 12. The DC-DC converter 20 ensures that auxiliary voltages and controlling clock signals are distributed to the various analog modules and to the logic module.

The operation described above can be applied to controlling two stepper motors, each motor controlling one of the two axes of a moving antenna, by using the microstep technique.

This implies controlling both components of the electromagnetic torque of each motor, i.e. the currents flowing through the two windings.

If $i_1$ and $i_1$ are the amplitudes of these currents, then:

$$i_1 = I \sin \alpha t$$

$$i_2 = I \cos \alpha t$$

where I and $\alpha$ are two parameters defined by the control law. Since the moving antenna requires the torque of both motors to be controlled, the analog control module must continuously provide the following current servo-control:

$$i_{1X} = I \sin \alpha t$$

$$i_{2X} = I \cos \alpha t$$

$$i_{1Y} = I \sin \beta t$$

$$i_{2Y} = I \cos \beta t$$

where X and Y indicate the axes of the mechanism and where I, $\alpha$, and $\beta$ are parameters of the control law.

Non-redundant operation of the power electronics for the moving antenna requires the participation of four identical modules for resulating four independent currents depending on the digital information from the logic module.

Redundant control electronics on redundant stepper motor windings requires all of these functions to be duplicated.

By virtue of its electrical design based on a structure in which power is controlled by current, each analog module regulates the current in one of the windings to comply with a determined reference, regardless of the voltage available on the electrical power supply of the satellite (26.5 to 42.5 volts).

The sampled type operation of the power structure using MOS-FET type switches makes it possible to guarantee efficiencies of better than 85% under extreme operating conditions.

A triangular reference may be selected for this operation since it makes it possible to verify the behavior of the regulation at control discontinuities.

Naturally the present invention has been described and shown merely by way of preferred example and its component parts could be replaced by equivalent parts without thereby going beyond the scope of the invention.

We claim:

1. A power supply module for electronic control of a pulse-operated motor, said module comprising, in succession:

an input filter providing an output;

a bidirectional current supply module delivering a voltage pulse of variable duration derived from a nonregulated voltage source and accompanied by a current of controlled amplitude;

a bridge stage having bidirectional switches and associated diodes, said bridge stage having first and second terminals each coupled to a pair of said switches, with diagonally opposite ones of said switches being simultaneously excited, said switchs being connected to one winding of said motor, a current flowing in said winding being a parameter to be regulated by comparison with a sine wave type reference value;

a source of clock signals;

an error amplifier receiving a current reference value as one input and a current value from said bridge as another input;

a current control cell connected to the current supply module and receiving a signal from said clock, a signal from said output of said input filter, and a signal from said error amplifier;

a DC-DC converter connected to the output of the input filter for ensuring that auxiliary voltages and controlling clock signals are well distributed;

said current supply module generating a pulse of variable duration $\tau$ which is applied to said first bridge stage terminal for providing in said winding a triangular current waveform varying between a minimum value and a maximum value, which waveform, within each period, comprises first and second linear portions of opposite slope, the first portion having the form $(V-Vo)t/L$ during charging, and the second portion having the form $-(Vo)t/L$ during discharging, the amplitude of said triangular current being controlled by controlling said duration $\tau$.

2. A module according to claim 1, wherein the motor is a stepper motor.

3. A module according to claim 1, wherein the bridge stage comprises four field effect transistors which conduct in both directions, connected in pairs to two floating control stages each corresponding to one direction of flow of a current iL through the motor winding.

* * * * *